Figure 1:
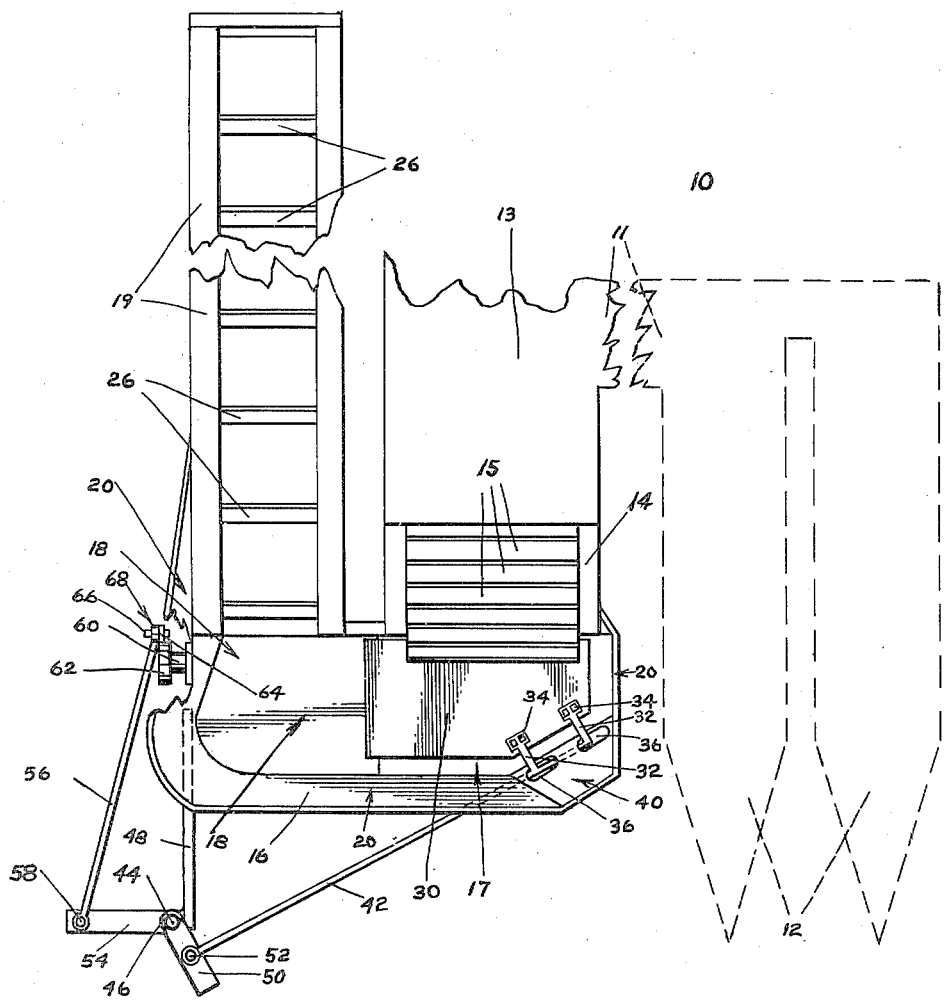

May 30, 1950     T. W. JOHANNSEN     2,509,737
CORN HARVESTING MECHANISM

Filed Feb. 28, 1947     2 Sheets-Sheet 1

T. W. Johannsen Inventor

By Arthur H. Sturges

Attorney

May 30, 1950        T. W. JOHANNSEN        2,509,737
CORN HARVESTING MECHANISM

Filed Feb. 28, 1947        2 Sheets-Sheet 2

T. W. Johannsen, Inventor

By Arthur H. Sturges, Attorney

Patented May 30, 1950

2,509,737

UNITED STATES PATENT OFFICE 2,509,737

CORN HARVESTING MECHANISM

Thorwald W. Johannsen, Buckgrove, Iowa

Application February 28, 1947, Serial No. 731,679

1 Claim. (Cl. 130—5)

This invention relates to corn pickers and more particularly, it is an object of the invention to provide a means for assuring that ears of corn will pass freely from the husking rolls of the corn picker to the elevator thereof.

Corn pickers are frequently of a construction employing husking rolls disposed in side by side parallelism with an elevator, the latter being for the purpose of conveying husked ears of corn upwardly for delivery to a wagon. In such corn pickers a trough is employed for receiving husking ears from the husking rolls and for guiding such ears to the elevator. Frequently such troughs become jammed with ears of corn; this is especially so when the ears are wet or of an unusually large size, the ears tending to slide less freely across the bottom of the trough and to pile up, jamming and frequently overflowing the trough.

It is, therefore, another object of the invention to provide a plate disposed above the bottom of the trough for receiving ears of corn from the husking rolls and means actuated by other moving parts of the corn picker for causing the plate to reciprocate to cause the ears to flow freely from the husking rolls to the elevator.

A still further object of the invention is to provide a reciprocating plate, as described, which is drivably secured to that rotating shaft which is normally transversely disposed adjacent the lower end of the elevator of a corn picker for driving the endless belt of the latter.

Other and still further objects and advantages of the invention will become apparent from the following detailed description of a preferred embodiment thereof.

Figure 2:
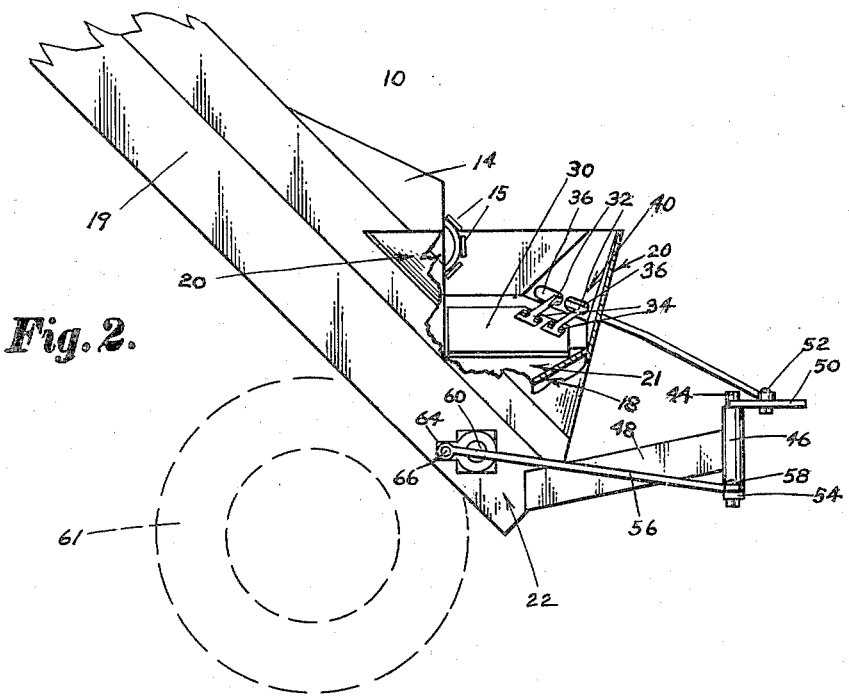
Figure 3:
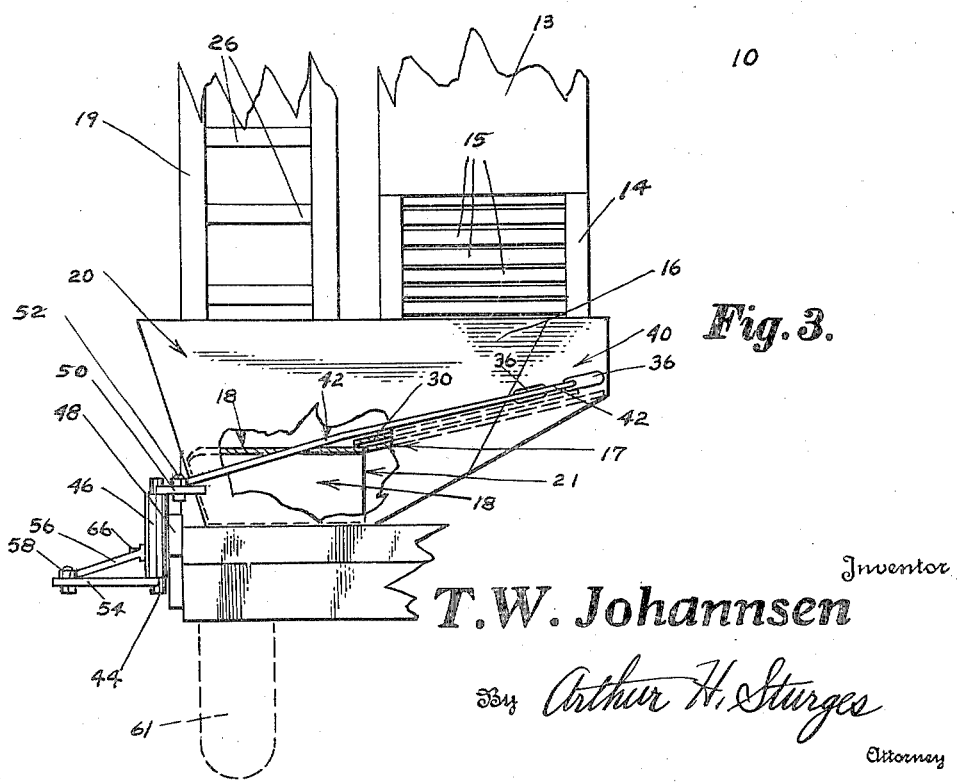

In the drawings:

Figure 1 is a top plan view of a portion of a corn picker showing a reciprocating plate and driving mechanism of the present invention disposed in a trough of the corn picker, the elevator, husking rolls and trough of a corn picker and mechanism of the present invention being shown in full lines, the corn snapping portion of the corn picker being shown in dotted lines, certain portions of the corn picker being shown in dotted lines;

Figure 2 is a side elevation of the corn picker elevator, husking rolls, and trough, with the present invention attached, a wheel of the corn picker being shown in dotted lines, and a portion of the trough being broken away; and Figure 3 is a frontal elevation of that portion of the corn picker shown in Figure 2, shown with the mechanism of the present invention attached thereto, certain portions of the trough being broken away.

The device of this invention is for attachment to a corn picker of a conventional construction, the latter being generally indicated at 10 in Figure 1. The corn picker 10 is of the type shown and described on page 24 of the catalog of Harry Ferguson, Incorporated, Detroit, Mich., the catalog and the corn picker shown being referred to as the "Wood Bros. Corn Picker WB-1-P."

The corn picker 10 includes a pair of oppositely disposed guides as shown in dotted lines at 12. The guides 12 are for receiving corn stalks therebetween and are normally provided with snapping rolls or augers, not shown, for breaking the ears of corn away from the stalks thereof. The corn is then delivered by a conveyor 11 to a husking mechanism partly enclosed in the housing 13. The husked ears are then carried forwardly by a husking mechanism conveyor 14 having flights 15, the conveyor 14 being considered a part of the husking mechanism, and the latter husks the corn. The ears then fall from the forward end of the conveyor 14 into a hopper or trough 16.

The trough 16 is transversely disposed with respect to the direction of travel of the corn picker 10 and is provided with an inclined bottom including two inclined bottom portions 17 and 18, surrounded by a side wall 20. The inclined bottom portions 17 and 18 of the trough 16 are disposed in different planes, as best seen in Figure 2, the said planes being transversely disposed with respect to each other. The upper bottom portion 17 slopes downwardly and transversely of the corn picker 10 toward that side of the corn picker 10 on which a later described elevator 19 is disposed. The lower bottom portion 18 is inclined downwardly toward the rearward end of the corn picker 10 and toward the elevator 24. A triangular bottom portion 21 is welded or otherwise suitably secured to the bottom portions 17 and 18 in a vertical plane to complete the trough bottom. The upper bottom portion 17 is disposed above the lower portion 18. The upper end of the upper bottom portion 17 of the inclined bottom is disposed beneath the husking mechanism conveyor 14 for receiving ears of corn therefrom. The lower end of the lower inclined bottom portion 18 is disposed above the lower forward end 22 of the upwardly inclined elevator 19, the latter being disposed in side by side parallelism with the husking mechanism conveyor 14. The lower end of the upper bottom portion 17 and the upper end of the lower bottom portion 18 are preferably disposed at the same height.

Corn, from the husking mechanism conveyor 14, normally falls by gravity upon the upper end of the inclined bottom 18 and slides toward the lower end thereof and into the elevator 19. The corn is then carried by the flights 26 of the endless belt of the elevator 19 upwardly and rearwardly into a wagon, not shown.

The device of this invention is for the purpose of assuring that corn will slide freely across the inclined bottom 18 of the trough 16 and includes a reciprocating plate 30 disposed above the upper portion 17 of the inclined trough bottom. The plate 30 is similarly inclinedly disposed and may be in parallelism with the upper bottom portion 17.

The plate 30 is preferably of a generally rectangular shape and is provided with an outer circumference complemental to the adjacent end of the trough 16. The plate 30 is of a lesser size than the outer circumference than the adjacent walls of the trough 16 for the purpose of spacing the plate 30 from the walls 20 of the trough 16 to permit the reciprocation of the plate 30 between the walls 20. The plate 30 may be provided with "fish scales," or the like, on its upper surfaces. Such fish scales would be stair-stepped downwardly toward the lower end of the reciprocating plate 30 and would facilitate the movement of corn in one direction only across the plate 30.

Means are provided, by the invention, for causing the plate 30 to reciprocate or agitate, such reciprocation causing means including a plurality of fingers 32. Each of the fingers 32 is riveted or otherwise suitably secured at one of its ends to the plate 30 as best shown at 34. The opposite ends of the fingers 32 are each disposed through one of a plurality of suitable slots 36 in the side wall 20 of the trough 16. That portion 40 of the wall 20, which is provided with the slots 36, is preferably flat or disposed in a single plane, that plane extending at an acute angle with respect to the direction of travel of the corn picker 10. The forward end of the wall portion 40 is disposed toward that side of the corn picker 10 on which the elevator 19 is situated. The longitudinal axes of the slots 36 are in alignment with each other and are disposed in parallelism with the plate 30. In lieu of the finger 32, obviously a single solid member may be substituted; and a single large aperture or slot may be employed in place of the several slots 36.

A reach rod 42 is secured at one of its ends to the other ends of the finger 32. The other ends of the reach rod 42 extends forwardly and to that side of the corn picker of which the elevator 19 is arranged, the reach rod of 42 being in parallelism with the wall portion 40.

A bell-crank mechanism, including a main vertically disposed shaft 44, is disposed forwardly of the corn picker 10 on that side of the corn picker 10 on which the elevator 19 is arranged. The main shaft 44 of the bell-crank mechanism is mounted in a vertically disposed bearing 46 and the latter is welded or otherwise suitably secured to a supporting bar 48, which latter extends forwardly and upwardly from the lower end of the elevator 19. The bar 48 may be welded or otherwise suitably secured to the outside of the lower forward end 22 of the elevator 19.

On the upper end of the shaft 44 one arm 50 of the bell-crank mechanism is rigidly secured. The arm 50 is pivotally attached by suitable means, indicated at 52, to the forward end of the reach rod 42. The other arm 54 of the bell-crank mechanism is rigidly secured to the lower end of the shaft 44 and a bar 56 is pivotally secured by suitable means shown at 58 to the arm 54 of the bell-crank mechanism.

The arms 50 and 54 are so disposed with respect to each other upon the shaft 44 that the arm 50, although moving, will at all times be positioned at generally a right angle with respect to the reach rod 42 and the other arm 54 will be at all times positioned in substantially a transverse position with respect to the direction of travel of the corn picker 10.

Corn pickers of the type described are usually provided with a shaft 60 transversely disposed with respect to the direction of travel of the corn pickers, the shaft 60 being positioned at the forward lower end of the elevator 19 for driving the endless belt of the latter. The shafts, such as 60, are usually drivably secured to other moving parts of the corn picker 10 such as, for instance, the wheels 61 thereof so that at times when the corn picker is in operation, the shaft 60 will rotate. The shaft 60 will normally extend a certain distance outwardly from the side of the elevator 19. In the practice of the present invention, a collar 62 is disposed about the outward end of the shaft 60 and rigidly secured thereto. The collar 62 is provided with an ear 64 outstanding at one side thereof, the ear 64 being provided with an aperture for receiving a suitable pin 66. The latter is eccentrically disposed with respect to the shaft 60. The rearward end of the bar 56 is provided with a flattened apertured portion 68, for receiving the pin 66.

As thus described, it will be seen that in operation, at times when the corn picker 10 is moving forwardly and the wheels thereof are turning, the shaft 60 is also rotating, the flights 26 of the endless belt of the elevator 19 will be moving rearwardly and upwardly, and husking ears of corn will be falling by gravity from the forward end of the husking mechanism conveyor 14. As the corn falls out of the husking mechanism conveyor 14, it will be received upon the plate 30 and will be caused, by the reciprocation of the latter, to move freely downwardly toward the lower bottom portion 18. Such reciprocation will be caused by the rotation of the shaft 60 acting through the eccentric pivot pin 66 causing a reciprocation of the bar 56, the direction of such reciprocation is altered by the bell-crank mechanism in such a manner that the reach rod 42 will cause an agitation or a reciprocation of the plate 30 generally upwardly and downwardly and in a transverse direction with respect to the trough 16.

From the foregoing description, it is thought to be obvious that a corn harvesting mechanism, constructed in accordance with my invention, is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as claimed.

I claim:

In a corn husker having a frame; a husking mechanism for separating ears of corn from the husks thereof; an elevator longitudinally disposed with respect to said corn picker for conveying husked ears upwardly for delivery to a wagon, said elevator being inclined downwardly toward the front of said corn picker, said elevator having an endless belt, said husking mechanism and elevator being disposed side by side, the forward end of said elevator being disposed lower than the forward end of said corn husking mechanism; and a shaft transversely disposed adjacent the lower end of the elevator for driving said endless belt: means for facilitating the movement of ears of corn from said husking mechanism to said elevating mechanism comprising a trough transversely disposed across the forward ends of said husking mechanism and said elevator, said trough having an inclined bottom, the higher end of said bottom being disposed below the forward end of said husking mechanism, the lower end of said bottom being disposed above the lower end of said elevator, said trough having slots therethrough; a plate disposed above the bottom of said trough and below the forward end of said husking mechanism, said plate being inclined toward the lower end of said trough, and said plate being of a lesser length than said trough; a reach-rod secured at one of its ends to the other end of said fingers; a bell-crank mechanism rotatably secured to the frame of said corn picker, one arm of said bell-crank mechanism being pivotally secured to the other end of said reach-rod; a bar pivotally secured at one of its ends to the other arm of said bell crank mechanism; and means pivotally and eccentrically securing the other end of said bar to the adjacent end of said shaft for causing said bar to reciprocate during rotations of said shaft.

THORWALD W. JOHANNSEN.

REFERENCES CITED

The following references are of record in the file of this patent:

UNITED STATES PATENTS

| Number | Name | Date |
|---|---|---|
| 741,868 | Witte | Oct. 20, 1903 |
| 1,386,207 | Sissel | Aug. 2, 1921 |
| 1,556,016 | Norral et al. | Oct. 6, 1925 |
| 1,699,955 | Cope | Jan. 22, 1929 |
| 2,011,925 | Benjamin | Aug. 20, 1935 |
| 2,255,168 | Hyman et al. | Sept. 9, 1941 |